United States Patent [19]

Phelps et al.

[11] Patent Number: 4,745,552

[45] Date of Patent: May 17, 1988

[54] ANTI-SPIN CONTROL APPARATUS AND METHOD

[75] Inventors: Weldon L. Phelps, Dunlap; Alan L. Stahl, Peoria; Giles K. Sorrells, Dunlap, all of Ill.

[73] Assignee: Caterpillar Inc., Peoria, Ill.

[21] Appl. No.: 846,314

[22] Filed: Mar. 31, 1986

[51] Int. Cl.$^4$ ................................................. B60T 8/34
[52] U.S. Cl. ................................. 364/426; 180/197; 361/238; 303/96
[58] Field of Search ................ 364/426, 565; 180/197; 361/238; 303/93, 95, 96, 92

[56] References Cited

U.S. PATENT DOCUMENTS

| | | | |
|---|---|---|---|
| Re. 30,763 | 10/1981 | Hirzel et al. | 364/426 |
| 3,802,529 | 4/1974 | Burckhardt et al. | 180/82 |
| 4,143,926 | 3/1979 | Miller | 303/92 |
| 4,154,487 | 5/1979 | Vannini et al. | 180/197 |
| 4,260,199 | 4/1981 | Reinecke | 303/96 |
| 4,344,139 | 8/1982 | Miller et al. | 364/426 |
| 4,349,233 | 9/1982 | Bullard et al. | 303/96 |
| 4,361,871 | 11/1982 | Miller et al. | 364/426 |
| 4,484,280 | 11/1984 | Brugger et al. | 180/197 |
| 4,521,856 | 6/1985 | Phelps et al. | 364/426 |
| 4,583,611 | 4/1986 | Frank et al. | 303/96 |
| 4,625,824 | 12/1986 | Leiber | 303/96 |

Primary Examiner—Gary Chin
Attorney, Agent, or Firm—Stephen L. Noe

[57] ABSTRACT

Anti-spin control systems are useful, for example, in industrial off-road vehicles. It is desirable that such systems exhibit rapid response to adverse working conditions, and be capable of quickly applying braking forces to whichever driven wheel is rotating at a higher velocity at a given time. The instant invention includes an electrical circuit for producing first and second brake control signals having values responsive to a working condition wherein one of the vehicle wheels loses traction and rotates more rapidly than the other vehicle wheel. A first controllable valve receives the first brake control signal and responsively controllably engages a brake mechanism associated with the faster rotating wheel, while a second controllable valve receives the second brake control signal and responsively controllably moves a brake mechanism associated with the slower rotating wheel from a brake released position to a brake pre-engaged position. Therefore, upon detecting a slippery working condition, each of the brake mechanisms associated with the driven wheels of the vehicle is brought into a state of readiness for immediate braking effort with minimal time delay.

9 Claims, 5 Drawing Sheets

ANTI-SPIN CONTROL APPARATUS AND METHOD

TECHNICAL FIELD

This invention relates generally to anti-spin control systems for vehicles having differentially driven wheels in which slip is controlled by application of a braking force to the slipping wheel, and, more particularly, to an apparatus and method for applying the braking force in a manner highly responsive to a detected slip condition.

BACKGROUND ART

It is well-known that vehicles having spaced apart drive wheels or wheel sets powered by a single engine through a differential mechanism are particularly problematic when one of the differentially driven wheels or wheel sets loses traction. Conditions which give rise to a loss of traction are commonly found in construction sites, mines, and other off-road situations. A vehicle having one of two differentially driven wheels or wheel sets located on a slippery surface and the other located on a surface providing good traction is often unable to move, owing to the fact that the differential mechanism directs full engine power to the wheel having no appreciable traction. The result is a slip condition in which the wheel having no traction rotates at higher than normal speed and the wheel having traction remains stationary.

To alleviate such problems, various mechanical and electro-mechanical anti-spin devices have been developed and placed in commercial service. A particularly advantageous anti-spin system utilizes electronics to supply a braking force to the slipping or spinning wheel. The application of braking force to the slipping wheel simulates increased traction at that wheel and results in a more even distribution of power between the differentially driven wheels. An effective example of this approach is described in U.S. Pat. No. 4,344,149, issued to Miller et al. on Aug. 10, 1982, and assigned to the assignee of the instant application. Miller discloses an apparatus for applying a proportionally variable braking force to the wheel which loses traction, during a slip control time period. A slip signal is produced responsive to any difference between the rotational velocity of the differentially driven wheels, and the slip signal is compared with a predetermined reference signal. In response to the slip signal exceeding the reference signal, the system selectively applies a braking force to the faster turning wheel. The braking force is modulated proportionally according to the degree of slip represented by the slip signal.

The Miller electronic approach to anti-spin control offers numerous technical advantages over earlier pure mechanical systems. However, like various other known electronic control systems, under defined conditions the Miller system suffers from one particular problem. Most off-road vehicles include spring applied parking brakes that are maintained in a released position by the application of hydraulic oil pressure. In order to engage such brakes, a substantial amount of oil must be exhausted from the system before the brake shoes make contact with the friction surface. Therefore, a significant amount of time elapses between the command to apply the brakes and the actual application of braking force. The inherent delay in applying the parking brakes is normally of no consequence. However, when these brakes are utilized to exercise dynamic control over a spinning wheel, the pressure induced delays can significantly affect the effectiveness of the system.

In a typical operating condition in which slippery surfaces are encountered, traction is often less than dependable with respect to both driven wheels of the vehicle. Frequently, the particular wheel having the best traction varies from time-to-time while traversing the terrain. Under such conditions, it is desirable to pre-excite both brake mechanisms to a point just short of actual brake engagement. Such pre-excitation exhausts the large volume of excess oil maintaining the opposing brake sets in the fully released position, and prepares the brakes for rapid and responsive application as required. By pre-exciting the brakes, the control system is able to provide continuous and well modulated control over both driven wheels, with minimal time delays caused by the need to exhaust oil from the system and with virtually no time delay in transferring braking action from one vehicle wheel to the other as traction conditions fluctuate.

The present invention is directed to overcoming one or more of the problems as set forth above.

DISCLOSURE OF THE INVENTION

In one aspect of the present invention, an anti-spin apparatus for controlling the power delivered through a differential mechanism to at least two wheels of a vehicle is provided. The vehicle has first and second brake mechanisms associated with respective ones of the wheels, with each of the brake mechanisms having an engageable portion movable between a brake released position, a brake pre-engaged position, and a range of brake engaged positions. An electrical circuit controllably produces first and second brake control signals in response to a working condition wherein one of the wheels loses traction and rotates more rapidly than another of the wheels. First and second controllable valves receive respective ones of the first and second brake control signals and responsively controllably actuate the brake mechanisms. Each of the first and second brake control signals is at least sufficient to cause the respective controllable valve to move the associated brake engageable portion from the brake released position to one of the brake pre-engaged and engaged positions.

In a second aspect of the present invention, a method for controlling the power delivered through a differential mechanism to at least two wheels of a vehicle is provided. The vehicle has first and second brake mechanisms associated with the respective wheels, each of the brake mechanisms having an engageable portion movable between a brake released position, a brake pre-engaged position, and a range of brake engaged positions. Each of the first and second brake mechanisms is connected to a respective proportional control valve. First and second brake control signals are produced in response to a working condition wherein one of the wheels loses traction and rotates more rapidly than another of the wheels. The first brake control signal causes the brake engageable portion associated with the faster rotating wheel to move from the brake released position to one of the range of brake engaged positions. The second brake control signal causes the brake engageable portion of the slower rotating wheel to move from the brake released position to the brake pre-engaged position. In response to the vehicle being continuously free from the working condition for a predetermined period of time, the brake control signals cause each of the brake engageable portions to move to the brake released position.

The present invention offers all of the advantages of prior anti-spin control systems, while further providing very rapid response to particular slip conditions. In the case where both wheels of the vehicle encounter slippery conditions, the instant control system is able to quickly respond to slow the faster rotating wheel without suffering from time response delays normally associated with vehicle brake engagement.

BRIEF DESCRIPTION OF THE DRAWINGS

For a better understanding of the present invention, reference may be made to the accompanying drawings, in which.

BEST MODE FOR CARRYING OUT THE INVENTION

Figure 1:
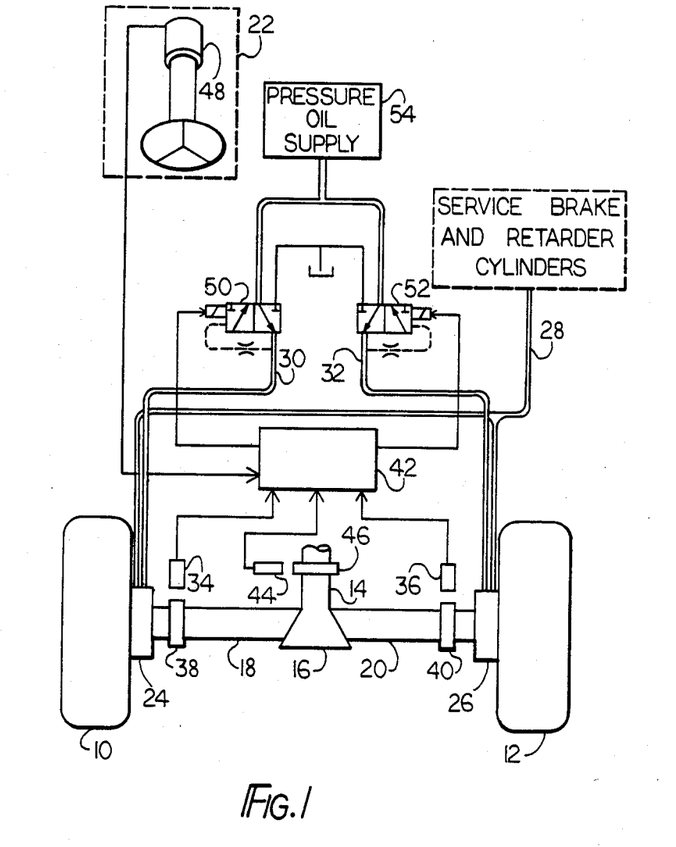
FIG. 1 is a diagram of a vehicle drive system including an anti-spin control in accordance with an embodiment of the present invention.

Referring first to FIG. 1, an anti-spin apparatus embodying certain of the principles of the present invention is illustrated. It should be understood that the following detailed description relates to the best presently known embodiment of the apparatus. However, the apparatus can assume numerous other embodiments, as will become apparent to those skilled in the art, without departing from the appended claims.

Wheels 10,12 are driven by an engine (not shown) through an input or drive shaft 14, a differential mechanism 16, and respective half-axles 18,20. A steering mechanism 22 is coupled to steerable wheels (not shown) of the vehicle. The drive system and steering systems are conventional and no further details are required for a full understanding of the present invention.

The wheels 10,12 are stopped by hydraulically engaged service brakes or by spring engaged parking brakes associated with brake mechanisms 24,26. The parking brakes are spring biased in the engaged position and are maintained in the disengaged position by application of hydraulic pressure, as disclosed in U.S. Pat. No. 3,927,737, issued Dec. 23, 1975, to P. F. M. Prillinger and assigned to the assignee of the instant application. The service brakes are normally actuated through a service brake pressure line 28 connected to the service brake and retarder master cylinders (not shown). Service brake systems are well-known in the art and do not form a part of this invention. The parking brakes are actuated through the parking brake pressure lines 30,32 as described in detail below.

Left and right wheel velocity transducers 34,36 operate in cooperation with respective first and second gear-like devices 38,40. Each of the left and right transducers 34,36 produce electrical signals having values responsive to the speed of rotation of the gear-like devices 38,40. These electrical signals are delivered to an electrical control circuit means 42. In addition, an input shaft velocity signal is delivered to the circuit means 42 from an input shaft velocity transducer 44 operating in conjunction with a third gear-like device 46. A steering transducer 48 is associated with the steering mechanism 22 and delivers an electrical signal to the circuit means 42. The electrical signal delivered from the steering transducer 48 is responsive to the angle and magnitude of steering commanded by the steering mechanism 22.

The circuit means 42 receives the various signal inputs, determines the existence, magnitude, and location of wheel slip during a loss of traction condition, and distinguishes between true wheel slip and a transducer failure. In response to detecting a true slip condition, the power transfer between the two differentially driven wheels 10,12 is modified by applying a proportional braking force to the wheel which loses traction. This is accomplished by delivering first and second brake control signals from the circuit means 42 to respective first and second controllable valve means 50,52. The controllable valve means 50,52 are of conventional design, and have output ports connected to the first and second parking brake pressure lines 30,32 and input ports connected to a source of pressurized brake fluid 54. In a first operating position of the first and second controllable valve means 50,52, full hydraulic pressure is applied from the pressure source 54 to each of the first and second brake mechanisms 24,26 through the respective brake lines 30,32. In a second operating position of the first and second controllable valve means 50,52, the magnitude of pressure delivered to the first and second brake mechanisms 24,26 from the pressure source 54 is controllably modulated according to the magnitude of the first and second brake control signals delivered from the circuit means 42.

Figure 2:
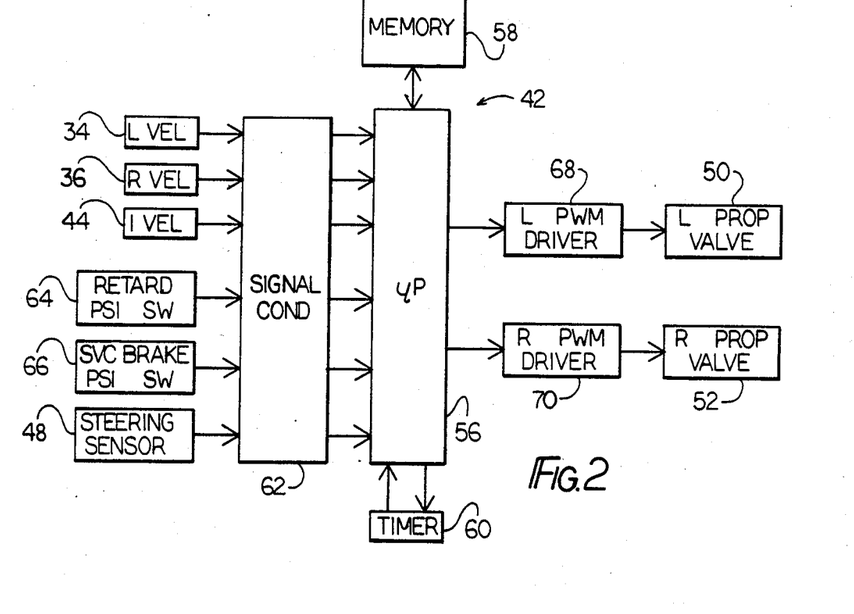
FIG. 2 is a block diagram of an embodiment of the present invention.

Referring now to FIG. 2, a block diagram of a preferred implementation of the anti-spin apparatus generally described above is presented. The circuit means 42 preferably includes a microprocessor 56 interconnected with a memory device 58 and a timer 60. The left and right wheel velocity transducers 34,36 and the input shaft velocity transducer 44 are connected to the microprocessor 56 through a signal conditioning circuit 62. A retard brake pressure switch 64 and a service brake pressure switch 66 are also connected to the microprocessor 56 through the signal conditioning circuit 62. Finally, the steering transducer 48 is connected in a similar fashion. A first brake control signal is delivered from the microprocessor 56 to the first controllable valve means 50. The first brake control signal acts, for example, upon the left side driven wheel of the vehicle, and is delivered to the controllable valve means 50 associated with the left wheel through a suitable pulse width modulated valve driver 68. In like manner, the second brake control signal is delivered from the microprocessor 56 to the second controllable valve means 52 through a corresponding pulse width modulated driver 70. The pulse width modulated servo valve drivers 68,70 proportionally control the respective first and second valve means 50,52 in the manner well-known in the art. Responsively, fluid pressure is modulated through the first and second proportional valves 50,52, and subsequently applied to the vehicle brake mechanisms 24,26 discussed with respect to FIG. 1.

Figure 3A:
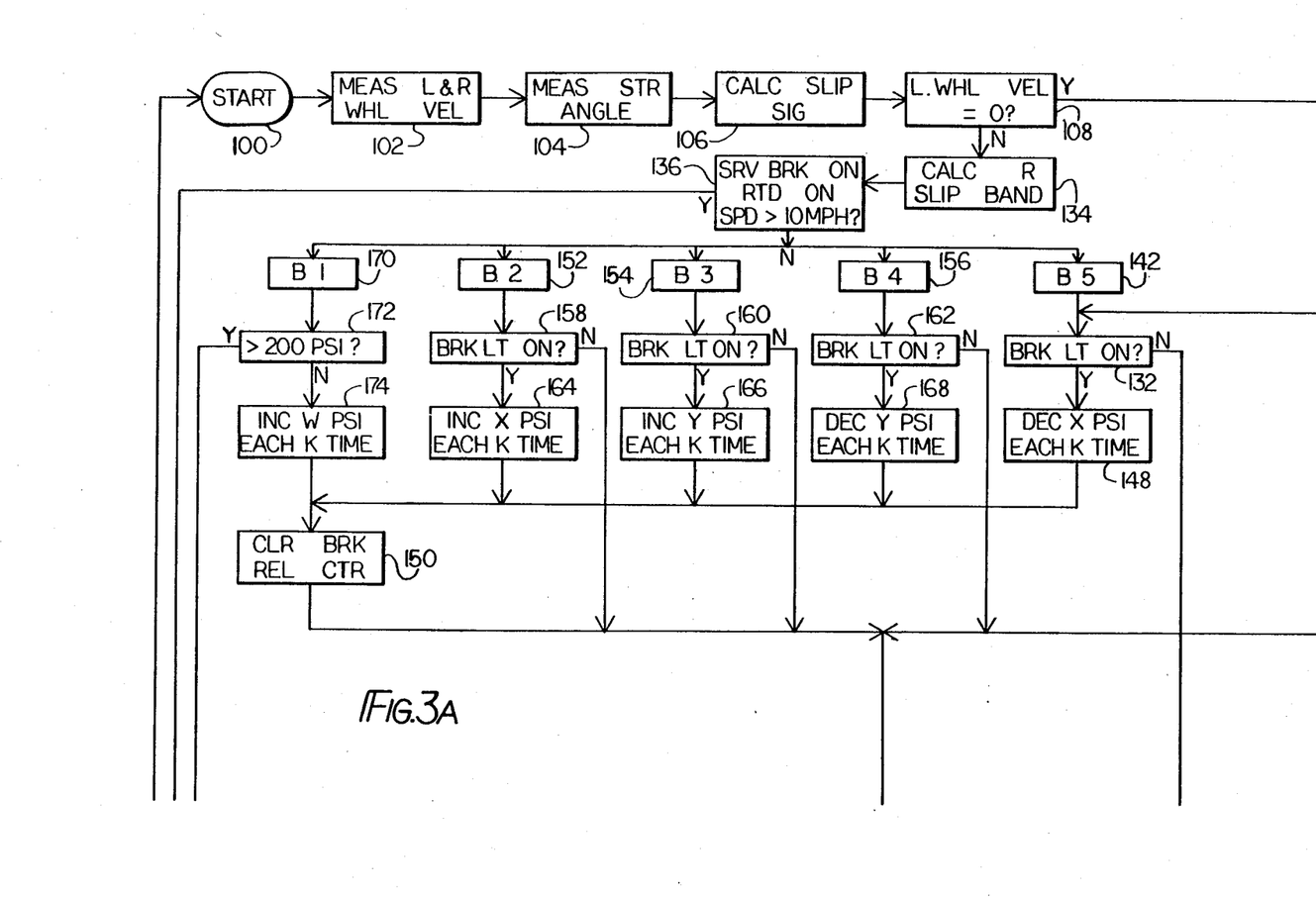
FIGS. 3A, 3B, and 3C are a functional flow diagram utilized with the embodiment of FIG. 2.
Figure 3B:
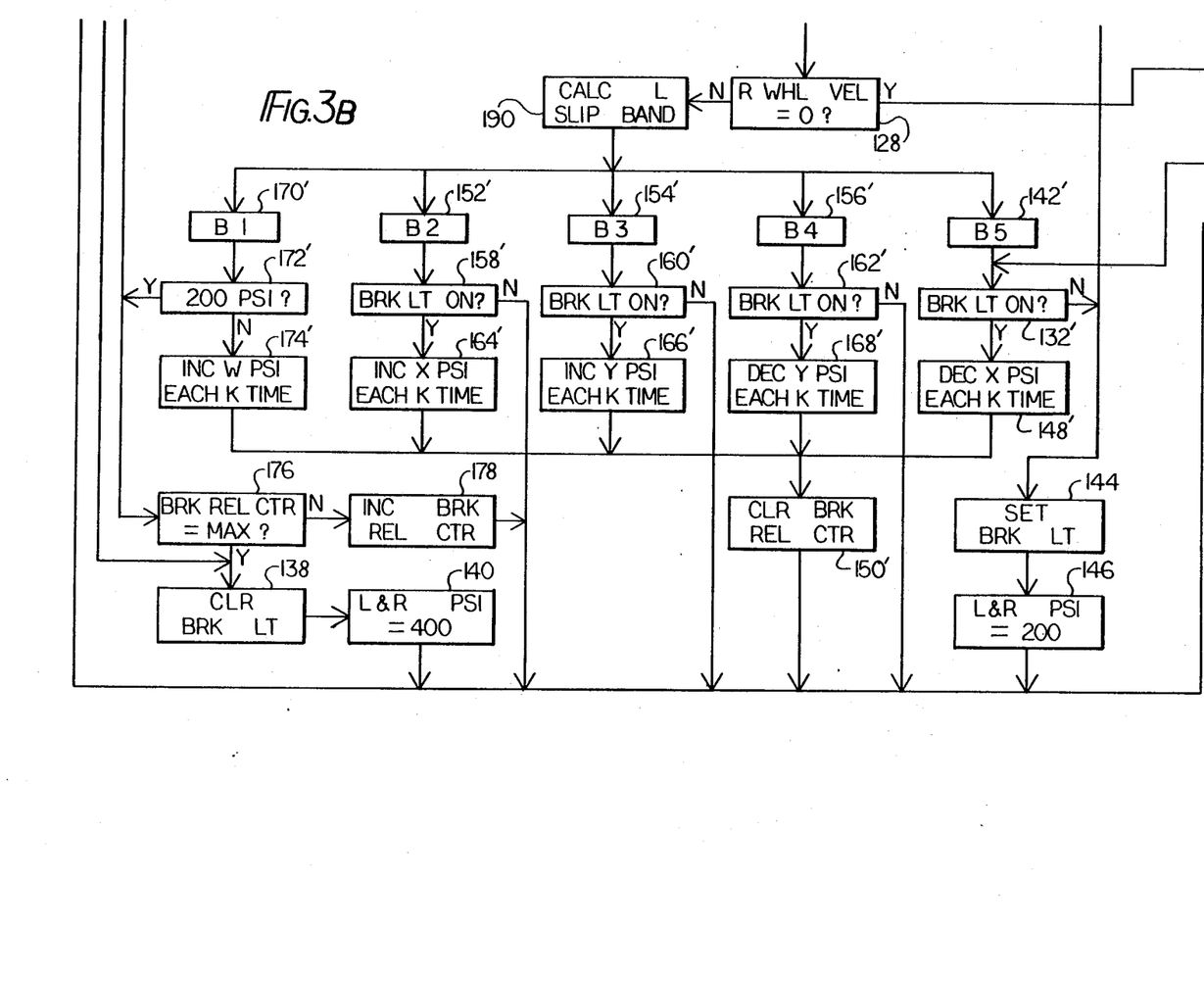
Figure 3C:
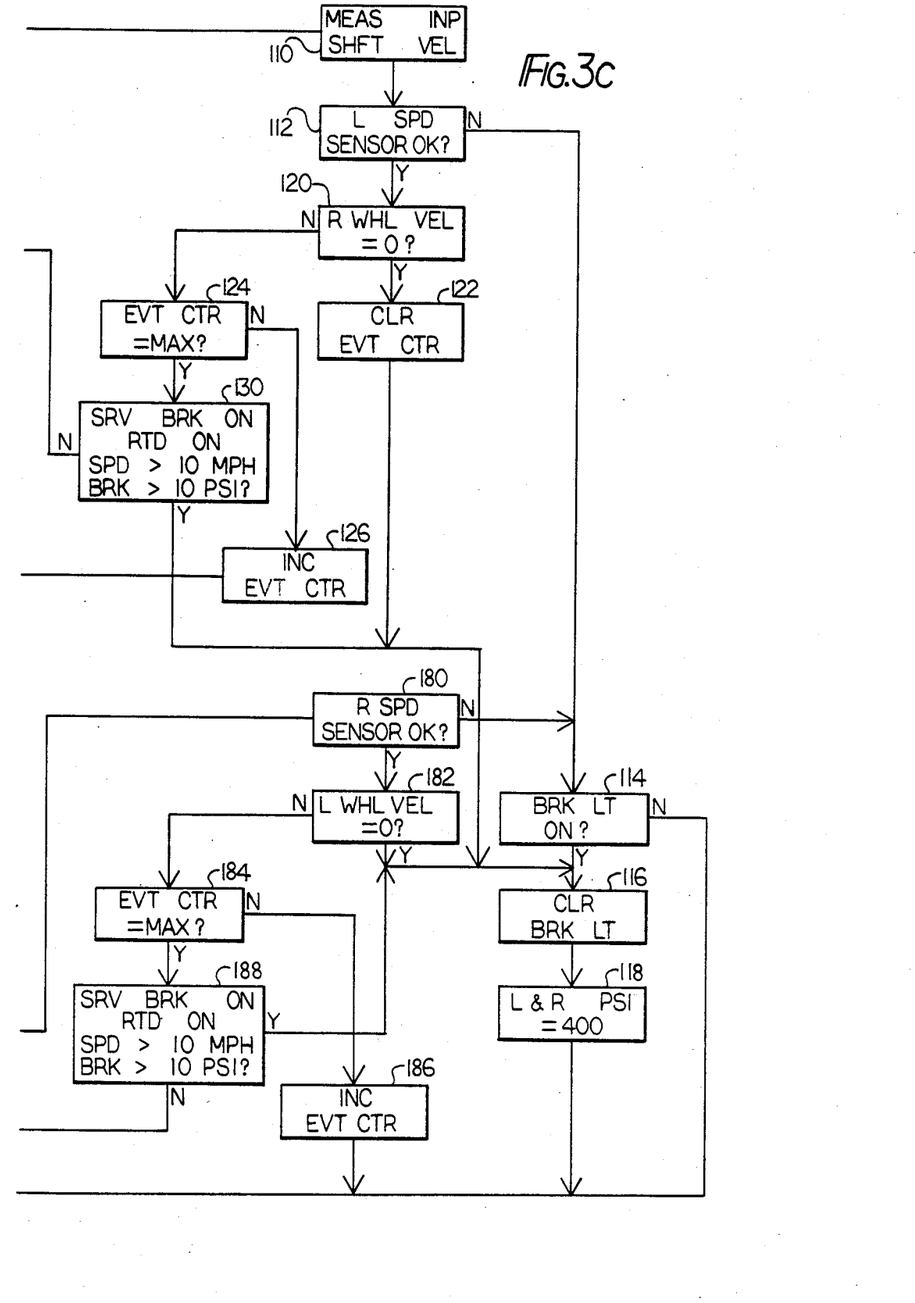
Figure 4:
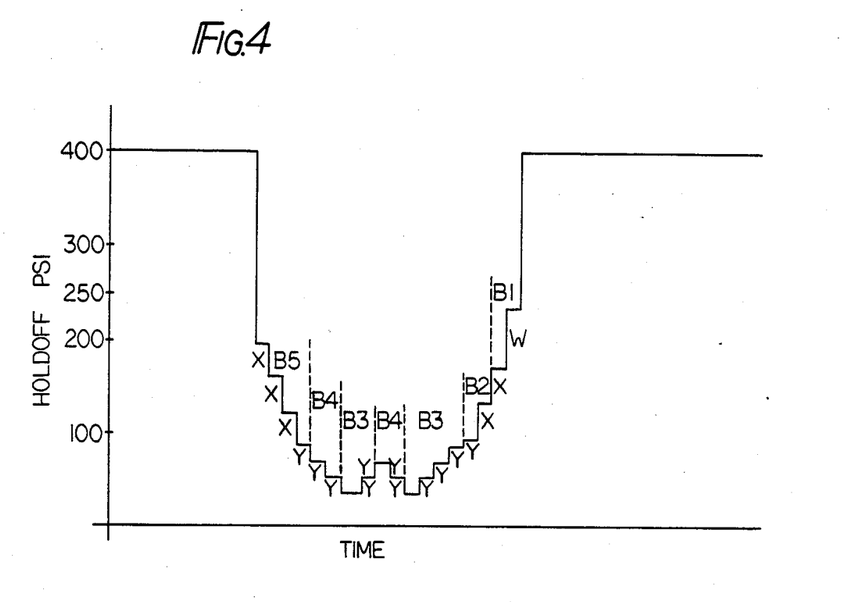
FIG. 4 is a graphical representation useful in describing the operation of the embodiment of FIG. 2.

Referring next to FIGS. 3A, 3B, and 3C, a functional flowchart defining the operation of the anti-spin apparatus is presented. In the preferred embodiment, this flowchart serves to detail the internal programming for the microprocessor 56. From this flowchart, a programmer of ordinary skill can develop a specific set of software instructions for a general purpose microprocessor suitable to implement the instant invention. It will be appreciated that, while the best mode of practicing the invention is considered to include a properly programmed microprocessor 56, resulting in the creation of novel hardware associations within the structure of the microprocessor 56 and its associated devices, it is possible to implement the instant invention utilizing traditional hardwired logic circuits. In the course of the following description, occasional reference to FIGS. 1 and 2, and to the graphical representation shown in FIG. 4, will be helpful in appreciating the technical discussion.

The embodiment of FIGS. 3A, 3B and 3C includes a plurality of slip value bands numbered 1-5, and is believed to be the best mode of practicing the instant invention. However, alternative embodiments not utilizing the band value system can be readily substituted for the disclosed system under appropriate circumstances. Beginning at the upper left hand corner of FIG. 3A, the flowchart description commences at the block 100 labeled "START". The left and right wheel velocities are determined according to the signals produced by the left and right wheel speed transducers 34,36 in the block 102, and the steer wheel angle is determined from the information supplied by the steer wheel transducer 48 in the block 104. A slip signal is then calculated in the block 106 having a value responsive to the difference in rotational velocity between the wheels 10,12 caused by the working condition and taking into account the steer wheel angle. If the left wheel velocity is found to equal "zero" in the block 108, program control passes to the block 110 in FIG. 3C.

In the block 110, the input shaft velocity detected by the input shaft velocity transducer 44 is measured and the condition of the left wheel velocity transducer 34 is determined in the block 112. This is accomplished in a known manner by calculating a normal range of right side wheel velocities according to the gear ratio within the particular differential 16 in use on the vehicle. If the left wheel velocity transducer 34 is defective, control passes to the block 114 where the status of a "brake latch" is determined. If the "brake latch" is found to be "off", control simply passes back to the START block 100. If the "brake latch" is set "on", it is turned "off" in the block 116 and the brake pressure for both the left and right vehicle brake mechanisms 24,26 is raised to maximum in the block 118, thereby releasing the parking brakes. Control then passes back to the START block 100.

Assuming that the left velocity transducer 34 is found to be satisfactory in the block 112, control passes to the block 120 where it is determined whether the right side wheel velocity is equal to "zero". If so, an "event counter" is cleared in the block 122 and control passes to the block 116 as described above.

If the right wheel velocity is not found to be "zero", control passes from the block 120 to the block 124 where the status of the "event counter" is determined. The "event counter" is a simple delay mechanism to insure that anti-spin control is not activated by momentary aberations not related to true slip conditions. If the "event counter" is not at a predetermined maximum number, it is incremented in the block 126 and control passes to the block 128 where the opposing side of the vehicle is controlled. If the "event counter" is at maximum, various status checks are made in the block 130 regarding the condition of the service brakes, the retarder, the vehicle speed, and the actual brake pressure.

If any of these conditions are found to be such that anti-spin control is not desirable, control passes to the block 116 and proceeds as described above. Assuming that all conditions are satisfactory, control instead proceeds to the block 132 where anti-spin control is actually initiated.

Assuming that the left side wheel velocity is not found equal to "zero" in the block 108, there is no need to determine the operability of the left wheel velocity transducer 34, and control passes to the block 134 where a slip band is determined for the right side vehicle wheel. Again, the status of the service brakes, retarder, and vehicle speed is checked in the block 136. If any of these conditions indicate that anti-spin control is not desirable, program control passes to the block 138 where the "brake latch" is cleared and then to block 140 where both brake mechanisms 24,26 are released by increasing the brake hold-off pressure to maximum. The program then proceeds to the START block 100. Assuming that conditions checked in the block 136 are satisfactory for anti-spin control, the particular slip signal value band associated with the calculated right side slip signal is entered.

The slip value bands are contiguous, with the upper limit of one band forming the lower limit of the next. Band 5 represents the most serious slip condition as determined by the largest deviation between left and right side wheel speeds, discounting differences caused by steering. Slip control always begins with band 5. Once the slip control mode is entered through band 5, control sequences through the other bands producing a smooth transition back to the normal or unbraked mode. Assuming that the slip condition is such that band 5 is entered via the block 142 or the block 130, the status of the "brake latch" is next checked in the block 132. The "brake latch" is simply a software switch indicating whether anti-spin control is already in progress or whether this is the first recent entry into band 5. If the "brake latch" is not "on", control passes to the block 144 where the "brake latch" is set "on" and then to the block 146 where both left and right brake hold-off pressures are reduced to a value sufficient to bring the first and second brake mechanisms 24,26 into a pre-engaged position. For example, considering the graphical representation of FIG. 4, if maximum brake hold-off pressure is 400 psi and actual brake engagement occurs at approximately 200 psi, upon first entering the control mode the brake hold-off pressure is immediately reduced to 200 psi on each of the first and second brake mechanisms 24,26, thus establishing the condition wherein each of the brakes is ready for immediate application without a delay caused by the need to exhaust excess hold-off oil from the system. Program control then resumes at the START block 100.

Assuming that the "brake latch" has been set "on", control passes to the block 148 where the brake hold-off pressure is decremented by "X" psi at a periodic rate. In other words, the brake hold-off pressure is decremented by a predetermined amount at regular periodic intervals "K" as determined by the timer 60 associated with the microprocessor 56. Control then passes to the block 150 where a "brake release counter" is cleared, and then on to the block 128. The "brake release counter" is again a simple delay mechanism to prevent fully releasing the brakes, by applying maximum oil pressure, until it is ascertained that the low traction working condition no longer is a problem.

If the slip band calculated in the block 134 corresponds to any of bands 2–4, as represented by the corresponding blocks 152,154,156, the appropriate slip band is entered and the status of the "brake latch" is determined in the respective block 158,160,162. In each case, if the "brake latch" is found to be "off", control simply progresses to the block 128. Likewise, if the "brake latch" is found to be "on", control passes to the respective block 164,166,168, where the brake hold-off pressure is decremented or incremented by an appropriate predetermined amount every "K" time. Following each change in brake hold-off pressure, control proceeds to the block 150 as described above.

If the calculated slip band is found to correspond to band 1, band 1 is entered at the block 170 and the actual brake hold-off pressure is determined in the block 172. If the brake hold-off pressure is not greater than 200 psi, indicating that control has been under way and the right side brake is not yet fully released, control passes to the block 174 where the brake hold-off pressure is increased by a predetermined amount, and then to the block 150. However, if the brake hold-off pressure is found to be greater than 200 psi in the block 172, control passes instead to the block 176 where the status of the "brake release counter" is determined. If the "brake release counter" is not at maximum, indicating that the time delay for brake release has been yet expired, control passes to the block 178 where the "brake release counter" is incremented, and then back to the START block 100. Therefore, a delay is interposed following active anti-spin control whereby the brakes are maintained in the pre-engaged position for a predetermined time following correction of a slip situation. If, however, the "brake release counter" is found to be at maximum in the block 176, control passes to the block 138 where the brakes are fully released as described above.

Assuming that control has progressed to the block 128 via any of the paths discussed above, the right wheel velocity is considered to determine whether or not it is equal to "zero". If the measured right wheel velocity is equal to "zero", control passes to the block 180 in order to determine the operability of the right wheel velocity transducer 26. In a manner similar to that described with respect to determining the condition of the left wheel velocity transducer 24, control then passes to the block 182 where it is determined whether or not the left wheel velocity is equal to "zero". If so, control resumes at the block 116 as described above. If not, control progresses to the block 184 where the "event counter" is checked to determine whether a sufficient delay has occurred to engage the anti-spin control system. If the "event counter" is not at maximum, control passes to the block 186 where the "event counter" is incremented, and then on to the START block 100. If the "event counter" is found to be at maximum, control passes to the block 188, where the various preconditions for engaging the anti-spin control system are examined. If anti-spin control is not desirable, program control then progresses to the block 116 as described above. However, assuming that all conditions ere satisfied for engaging the anti-spin control, control instead passes to the block 132' where anti-spin control for the left side wheel of the vehicle occurs.

Assuming that the right side wheel velocity is not found to equal "zero" in the block 128, there is no need to question the operability of the right wheel velocity transducer 26, and control passes instead to the block 190 where the left side slip band value is calculated. Control then passes to the appropriate slip value band 1–5 in precisely the same manner as is fully discussed above. Owing to the similarity of operation between the left and right side slip value bands, the remaining blocks found in FIG. 3B that correspond directly to those blocks found in FIG. 3A are simply labeled with the identical element number followed by a "prime" ('). In other words, the discussion relating to the block 170 found in FIG. 3A is equally applicable to the block 170' in FIG. 3B, and the correspondence holds true for each of the other blocks identified in the two similar but distinct figures.

INDUSTRIAL APPLICABILITY

Operation of the anti-spin control apparatus is best described in connection with its use on a vehicle for controlling the power delivered through a differential mechanism 16 to at least two driven wheels 10,12. The vehicle is assumed to include first and second brake mechanisms 24,26 associated with respective ones of the wheels 10,12. Each of the first and second brake mechanisms 24,26 has an engageable portion movable between a brake released position, a brake pre-engaged position, and a range of brake engaged positions. In response to detecting a working condition wherein one of the wheels 10,12 loses traction or rotates more rapidly than the other of the wheels 10,12, a circuit means 42 controllably produces first and second brake control signals. The first and second brake control signals are delivered to respective first and second controllable valve means 50,52. Each of the first and second brake control signals is at least sufficient to cause the respective controllable valve means 50,52 to move the associated brake engageable portions from the brake released position to one of the brake pre-engaged and brake engaged positions.

Therefore, in the situation where the anti-spin control system has not been recently actuated, both of the first and second brake mechanisms 24,26 are in the brake released position, owing to the fact that the maximum brake release or hold-off pressure, for example, 400 psi, is applied to each of the first and second brake mechanisms 24,26 through the respective controllable valve means 50,52. Upon encountering a working condition wherein one of the wheels 10,12 loses traction and rotates more rapidly than the other of the wheels 10,12, the respective controllable valve means 50,52 receives the respective one of the first and second brake control signals and responsively controllably moves the brake engageable portion of the faster rotating wheel 10,12 from the brake released position to one of the range of brake engaged positions. The particular pressure delivered to the brake mechanism 24,26 of the faster rotating wheel 10,12 is determined according to the wheel velocity relative to the slower rotating wheel 10,12, taking into account deviations causd by steering the vehicle. The remaining controllable valve means 50,52 receives the other of the first and second brake control signals and responsively controllably moves the brake engageable portion of the slower rotating wheel 10,12 from the brake released position to the brake pre-engaged position. In other words, although it is neither necessary nor desirable to apply the associated brake mechanism 24,26 to the slower rotating wheel 10,12, and indeed would be counterproductive to do so, the instant invention brings the associated brake mechanism 24,26 to a position just short of engagement, i.e., a pre-engaged position, such that application of the brake mechanism 24,26 can be immediately initiated should the working condition cause the formerly slower rotating wheel 10,12 to become the faster rotating wheel 10,12. This is in accordance with actual slip conditions wherein neither wheel 10,12 has particularly good traction and it is likely that both wheels 10,12 will encounter slip conditions of varying degrees over a period of time.

By providing for pre-engagement of the brake mechanism 24,26 associated with the slower rotating wheel 10,12 during a slip condition, rapid and appropriate control is readily available without the need found in prior systems to move the respective brake engageable portion from a fully disengaged position to an engaged position each time the brakes are automatically applied. It has been found that significant delays are encountered in moving the brake engageable portions through the nonactive range from the fully released position to the pre-engaged position. The instant invention, therefore, produces an enhanced anti-spin control system wherein fast response is available during adverse working conditions. A delay period is also provided to prevent moving the brake engageable portions back to the fully released position for a predetermined period of time after the vehicle is free from the adverse working condition. Once this predetermined delay has expired, the circuit means 42 controllably produces first and second predetermined brake control signals sufficient to cause the respective controllable valve means 50,52 to move both brake engageable portions back to the brake released position.

Other aspects, objects, advantages and uses of this invention can be obtained from a study of the drawings, the disclosure, and the appended claims.

What is claimed is:

1. An anti-spin apparatus for controlling the power delivered through a differential mechanism to at least two wheels of a vehicle, said vehicle including first and second brake mechanisms associated with respective ones of said wheels, each of said first and second brake mechanisms having an engageable friction portion movable between a brake released position, a brake pre-engaged position, and a range of brake engaged positions, comprising:

circuit means for controllably producing first and second brake control signals in response to a working condition wherein one of said wheels loses traction and rotates more rapidly than another of said wheels; and first and second controllable valve means for receiving respective ones of said first and second brake control signals and responsively controllably actuating said brake mechanisms, one of said first and second brake control signals being at least sufficient to cause said respective controllable valve means to move said respective brake engageable friction portion from said brake released position to said brake pre-engaged, position, and the other of said first and second brake control signals being at least suffieicnt to cause said respective controllable valve means to move said respective brake engageable friction portion from said brake released position to said brake engaged position.

2. Apparatus, as set forth in claim 1, wherein said circuit means controllably produces first and second predetermined brake control signals in response to said vehicle being continuously free from said working condition for a predetermined period of time, each of said first and second predetermined brake control signals being sufficient to cause said respective first and second controllable valve means to move said respective brake engageable friction portions to said brake released position.

3. Apparatus, as set forth in claim 2, wherein said circuit means includes first means for producing a slip signal having a value responsive to the difference in rotational velocity between said wheels caused by said working condition;

second means for defining first and second pluralities of slip signal value bands, each of said slip signal value bands being associated with a respective predetermined range of slip signal values; and third means for repeatedly comparing said produced slip signal value to each of said first and second pluralities of slip signal value bands and responsively producing said first and second brake control signals, each of said first and second brake control signals having a magnitude that is incrementally variable in response to time and to the respective slip signal value bands associated with the produced slip signal.

4. An anti-spin apparatus for controlling the power delivered through a differential mechanism to at least two wheels of a vehicle, comprising:

circuit means for producing a slip signal having a value responsive to the difference in rotational velocity between said wheels caused by a particular working condition, defining first and second pluralities of slip signal value bands, each of said slip signal value bands being associated with a respective predetermined range of slip signal values, repeatedly comparing said produced slip signal value to each of said first and second pluralities of slip signal value bands, and producing first and second incrementally variable brake control signals in response to the respective slip signal value bands that correspond to the produced slip signal;

first and second brake mechanisms, each associated with a respective one of said wheels and each having an engageable friction portion movable between a brake released position, a brake pre-engaged position, and a range of brake engaged positions;

first proportionally controllable valve means for receiving said first brake control signal and responsively controllably moving said respective brake engageable friction portion from said brake released position to said brake pre-engaged position; and second proportionally controllable valve means for receiving said second brake control signal and responsively controllably moving said respective brake engageable friction portion from said brake released position to said brake engaged position.

5. Apparatus, as set forth in claim 4, wherein said circuit means controllably produces predetermined first and second brake control signals, each being sufficient to move the respective associated brake engageable friction portion to said brake released position, in response to said produced slip signal value being associated with predetermined ones of said slip signal value bands for a predetermined period of time.

6. An anti-spin apparatus for controlling the power delivered through a differential mechanism to at least two wheels of a vehicle, said vehicle including first and second brake mechanisms associated with respective ones of said wheels, each of said first and second brake mechanisms having an engageable friction portion movable between a brake released position, a brake pre-engaged position, and a range of brake engaged positions, comprising:

circuit means for producing first and second brake control signals having values responsive to a working condition wherein one of said wheels loses traction and rotates more rapidly than another of said wheels;

a first controllable valve means for receiving said first brake control signal and responsively controllably moving said brake engageable friction portion of said faster rotating wheel from said brake released position to one of said range of brake engaged positions; and     a second controllable valve means for receiving said second brake control signal and responsively controllably moving said brake engageable friction portion of said slower rotating wheel from said brake released position to said brake pre-engaged position.

7. Apparatus, as set forth in claim 6, wherein said circuit means controllably produces first and second predetermined brake control signals in response to said vehicle being continuously free from said working condition for a predetermined period of time, each of said first and second predetermined brake control signals being sufficient to cause said respective first and second controllable valve means to move said respective brake engageable friction portions to said brake released position.

8. Apparatus, as set forth in claim 7, wherein said first and second brake control signals each vary incrementally in response to time and to said working condition of said vehicle.

9. A method for controlling the power delivered through a differential mechanism to at least two wheels of a vehicle, said vehicle including first and second brake mechanisms associated with respective ones of said wheels and each having an engageable friction portion movable between a brake released position, a brake pre-engaged position, and a range of brake engaged positions, each of said first and second brake mechanisms being operatively connected to a respective proportionally controllable valve means, comprising the steps of:

producing first and second brake control signals in response to a working condition wherein one of said wheels loses traction and rotates more rapidly than another of said wheels;

receiving said first brake control signal and responsively controllably moving said brake engageable friction portion of said faster rotating wheel from said brake released position to one of said range of brake engaged positions;

receiving said second brake control signal and responsively controllably moving said brake engageable friction portion of said slower rotating wheel from said brake released position to said brake pre-engaged position; and     moving each of said brake engageable friction portions to said brake released position in response to said vehicle being continuously free from said working condition for a predetermined period of time.

* * * * *